United States Patent [19]
Wimmer

[11] Patent Number: 4,574,291
[45] Date of Patent: Mar. 4, 1986

[54] PHASE LOCKED SYNCHRONIZER FOR PRINTER TIMING CONTROL

[75] Inventor: Guenther W. Wimmer, Portland, Oreg.

[73] Assignee: Tektronix, Inc., Beaverton, Oreg.

[21] Appl. No.: 645,577

[22] Filed: Aug. 29, 1984

[51] Int. Cl.⁴ ................. G01D 15/18; G01D 15/24
[52] U.S. Cl. ................................ 346/75; 346/138; 346/140 R
[58] Field of Search ............... 346/75, 140 R, 76 L, 346/138; 318/314

[56] References Cited

U.S. PATENT DOCUMENTS

| 4,065,773 | 12/1977 | Berry | 346/75 |
| 4,097,873 | 6/1978 | Martin | 346/75 |
| 4,480,215 | 10/1984 | Bax | 318/306 |
| 4,498,034 | 2/1985 | Shirakawa | 318/314 |

Primary Examiner—E. A. Goldberg
Assistant Examiner—Gerald E. Preston
Attorney, Agent, or Firm—John P. Dellett; Francis I. Gray

[57] ABSTRACT

An apparatus for generating a trigger signal having pulses synchronized with selectable angular displacement of a rotating object. The apparatus comprises a position encoder to monitor the rotation of the rotating object and to produce M output signal pulses during each revolution of the object, a frequency multiplier coupled to generate an output signal having a frequency N times the frequency of the position encoder output signal, and a frequency divider coupled to generate a pulsed trigger signal of frequency 1/Mth of the frequency of the frequency multiplier output signal, N being a selected integer and M normally being fixed by the physical contruction. The trigger signal comprises N pulses per revolution of the object and the angular displacement of the rotating object associated with each pulse of the trigger signal is selected by appropriate adjustment of N.

16 Claims, 1 Drawing Figure

PHASE LOCKED SYNCHRONIZER FOR PRINTER TIMING CONTROL

BACKGROUND OF THE INVENTION

The present invention relates in general to devices for producing trigger signals synchronized with the angular position of a rotating object and particularly to such a device wherein the number of trigger signals generated per revolution of the object is programmable.

In color copiers employing ink-jets it is necessary to coordinate the operation of an ink-jet with the angular position of a rotating drum. In an ink-jet copier, the copied image is formed on paper trained about the drum and as the drum rotates the ink-jets turn on and off spraying ink on the paper in a dot pattern to form the image. Changes in drum speed can cause errors in picture reproduction unless there is a compensating change in ink-jet triggering frequency. A similar problem can arise in coordinating the operation of a magnetic or laser recording head with the rotation of magnetic or laser activated disks or drums.

In the prior art it is common to attach a disk to the rotating object wherein the disk has been marked in some way at desired regular intervals about the disk. As the disk rotates the marks pass by a sensor (e.g. an optical sensor) which then produces a pulsed signal. The sensor signal may be used to trigger an external event to be synchronized with drum rotation, e.g. the imprinting of information.

In this method, the frequency of the triggering signal relative to the angular velocity of the drum is fixed by the number of marks about the disk. The disk must be changed if the external event is to be triggered more or less frequently with respect to drum rotation. It would be beneficial in many applications if the number of triggered events per revolution of the drum could be changed electronically without the need for changing the disk. For example in an ink-jet copier, this capability would facilitate adjustment of copier resolution.

SUMMARY OF THE INVENTION

The present invention relates to a synchronizer for generating a pulsed trigger signal synchronized with the angular position of a rotating object such as a drum in an ink-jet copy machine. A pulse is generated each time the object rotates through a predetermined angle, the angle being programmed by an externally applied data signal.

The synchronizer includes a position encoder, a phase locked programmable frequency multiplier, and a frequency divider. The position encoder produces a signal pulse whenever the drum rotates through a fixed angle. In the preferred embodiment, position detecting means comprises a slotted disk, a light transmitter and a light sensor. The disk, attached for rotation with the drum, is slotted at M regular intervals about its circumference and the light transmitter is mounted on one side of the disk while the light sensor is mounted on the opposite side of the disk such that each time a disk slot passes between the light transmitter and the light sensor, light from the transmitter strikes the sensor. The sensor produces an output pulse each time a beam of light strikes it and thus generates a signal of frequency $M \times R$ Hz where R is the rotational speed of the drum in revolutions per second.

The phase locked frequency multiplier comprises a phase detector, a filter, a voltage controlled oscillator (VCO) and a programmable frequency divider ("divide by N circuit") all connected in a loop. The programmable divide by N circuit produces an output signal of frequency 1/N times the frequency of an input signal where the value N is programmed by data from an external source such as a plurality of switches or a microprocessor. The output signals of the position detector and the divide by N circuit are applied to the phase detector and the phase detector supplies a signal proportional to the phase difference between its two input signals.

The output signal of the phase detector is applied to the filter which provides a control voltage coupled to the VCO for causing the latter to generate a signal of frequency proportional to such control voltage. The VCO output signal is coupled to the input of the divide by N circuit, closing a phase locked loop.

In operation, any perturbation in angular velocity of the rotating object modifies the phase difference between the sensor output signal and the divide by N circuit output signal. The phase difference change causes compensating changes in frequency of the VCO output signal until balance is restored. The phase locked loop maintains the VCO output signal at a frequency equal to $N \times M \times R$ Hz.

The VCO output signal is also applied to a fixed frequency divider, a "divide by M' circuit" where M' is a fixed number, the output of the divide by M' circuit being a signal of frequency $(N \times M \times R)/M'$. If M equals M', then the output signal frequency of the divide by M' circuit is $N \times R$. This signal may then be used as a reference to trigger external events to be coordinated with the rotation of the object, each pulse representing 1/Nth of a drum revolution. Since N is determined by data applied to the divide by N circuit, the frequency of the triggering signal with respect to drum angular velocity is likewise programmable and can be changed without changing the disk.

It is therefore an object of the present invention to provide a new and improved angular position synchronizer for generating a trigger signal each time an object rotates through a predetermined angle.

It is another object of the present invention to provide a new and improved angular position synchronizer wherein the number of trigger signals so generated per revolution of the drum can be changed by external control circuits without the need for mechanical adjustments or changes to synchronizer equipment.

The invention resides in the combination, construction, arrangement and disposition of the various component parts and elements incorporated in a programmable phase locked synchronizer constructed in accordance with the principles of this invention. The present invention will be better understood and objects and important features other than those specifically enumerated above will become apparent when consideration is given to the following details and description, which, when taken in conjunction with the annexed drawing describe, disclose, illustrate, and show a preferred embodiment or modification of the present invention and what is presently considered and believed to be the best mode of practicing the principles thereof.

DETAILED DESCRIPTION OF THE PREFERRED EMBODIMENT

Figure 1:
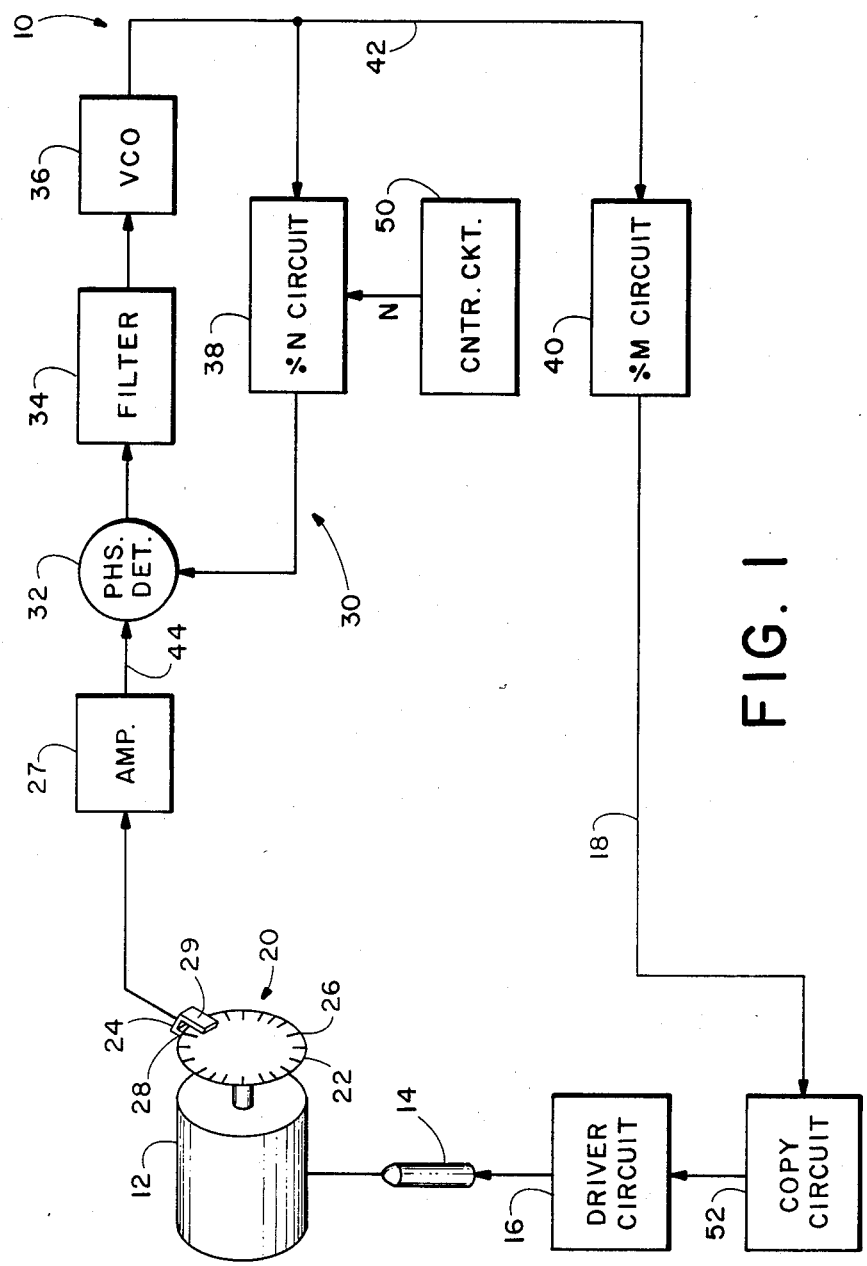
FIG. 1 is a block diagram of the preferred embodiment of the present invention.

FIG. 1 illustrates a block diagram of the present invention comprising a phase locked synchronizer 10 for generating a trigger signal synchronized with the angular position of a rotating object such as a drum 12. The trigger signal, generated on output line 18, comprises a stream of pulses, one pulse being generated each time drum 12 rotates through a preprogrammed fraction of a revolution.

The trigger signal is used to trigger the operation of ink-jets 14 via copy circuit 52 and driver 16 forming part of an ink-jet copy machine wherein the copied image is provided on paper trained about drum 12. As drum 12 rotates, ink-jet 14 turns on and off spraying ink dots on the paper to form the image. Several ink-jets may operate in parallel to form an image over the width of the paper during one revolution of drum 12 or alternatively, a single ink-jet 14 may move along the width of the paper forming the image as a series of dotted bands established during several revolutions of drum 12. In either case, ink-jet spraying is enabled by the trigger signal on synchronizer output line 18. Data from copy control circuit 52 containing pixel information obtained from the information being copied establishes whether or not an ink-jet actually sprays when so enabled.

If the trigger signal transmits N trigger pulses per revolution of drum 12, then the copy image will be made up of N/C pixels per unit length where C is the circumference of drum 12. Thus to modify the resolution of the copier it is necessary to modify the frequency of the trigger signal in pulses per revolution of drum 12.

Synchronizer 10 comprises position encoding means 20, phase locked programmable frequency multiplier 30, and frequency divider 40, labeled "divide by M' circuit". Position encoding means 20 monitors the rotation of drum 12 and produces a pulse on line 44 each time drum 12 rotates through a fixed fraction of a revolution. In the preferred embodiment, position encoding means 20 comprises slotted disk 22, sensor 24 and amplifier 27, disk 22 being attached for rotation with drum 12 and containing slots 26 at M regular intervals about its circumference. Sensor 24 comprises light transmitter 28 mounted on one side of disk 22 and light receiver 29 on the opposite side of disk 22 such that each time a disk slot 26 passes between light transmitter 28 and light sensor 29, light from transmitter 28 strikes sensor 29. Sensor 29 produces an output pulse each time a beam of light strikes it and the pulse is amplified by amplifier 27. If drum 12 rotates at R revolutions per second, then encoding means 20 generates a pulse train output signal of frequency $F_{enc} = M \times R$ Hz.

The output signal of position encoding means 20 is applied to phase locked frequency multiplier 30 which produces a pulsed output signal on line 42 having frequency $F_{fm} N \times M \times R$ where N is a selected, programmable integer. Frequency multiplier 30 comprises phase detector 32, filter 34, voltage controlled oscillator (VCO) 36 and programmable frequency divider ("divide by N circuit") 38 all connected in a phase locked loop. Programmable divide by N circuit 38 produces an output signal of frequency 1/N times the frequency of its input signal where the value N is programmed by data from an external control 50 which may comprise a simple bank of switches or a microprocessor. The output signal of position encoding means 20 and the output signal of divide by N circuit 38 are applied to phase detector 32 such that phase detector 32 produces a pulsed output signal having pulses of duration proportional to the phase difference between the two input signals.

The pulsed output signal of phase detector 32 is applied to filter 34 which generates an output voltage proportional to the pulse duration of the input signal from phase detector 32. The output voltage of filter 34 controls the operation of VCO 36 so that VCO 36 produces a pulsed output signal having a frequency proportional to the input voltage signal from filter 34. The VCO output signal is in turn applied as the input to divide by N circuit 38, thus closing the phase locked loop. In operation, any perturbation in angular velocity of drum 12 alters the phase difference between the pulsed output signal from encoding means 20 and the pulsed output signal from divide by N circuit 38. Any such phase difference causes the output signal of phase detector 32 to produce a change in output bringing about compensating changes in the frequency of the output signal of VCO 36 so that the output frequency of VCO 36 remains the prescribed multiple of the frequency of the output from amplifier 27. Since the output signal of VCO 36 is the input to divide by N circuit 38, and since the output signal of divide by N circuit 38 has a frequency 1/Nth of its input signal and is phase locked to the frequency of encoding means 20, the frequency of the output signal of VCO 36 is held to $F_{vco} = N \times M \times R$ Hz.

The VCO 36 output signal on line 42 is also applied to fixed frequency divider 40, a 37 divide by M' circuit", where M' is fixed. The output of the divide by M' circuit is suitably a pulsed signal of frequency 1/M' times the frequency of its input signal from VCO 36 and therefore the output signal frequency of circuit 40 is $F_{m'} = (N \times M \times R)/M'$. If M equals M', then the output signal frequency of the divide by M' circuit is just $F_{m'} = N \times R$. This output signal on line 18 may then be applied to copy circuit 52 and used as a reference to trigger ink-jet 14 operation, one pulse of the trigger signal occurring after every 1/Nth revolution of drum 12. Since the quantity N can be determined by data applied to divide by N circuit 30, the frequency of the triggering signal with respect to the drum's angular velocity is likewise programmable and can be changed without changing the rotating disk.

Circuit 40 suitably comprises a counter generating intermediate states 1 through M'. Intermediate values may be used to digitally address or construct a complex ink-jet excitation waveform (e.g. a sine wave or other waveform) which is gated by the copy circuit 52 in response to outputs of circuit 40.

It is convenient to think of the output signal from encoding means 20 as including a carrier which is modulated by changes in the angular velocity of drum 12. The sampling interval should be small enough to allow adequate attenuation of the carrier frequency without significantly attenuating the drum velocity modulation components.

Encoding means 20 may be implemented in a variety of ways well known in the art and is not limited to the slotted disk and sensor arrangement described above. Phase detector 32, filter 34, VCO 36 and frequency dividers 38 and 40 are all also devices which may be implemented in a variety of ways commonly known to those skilled in the art and need not be further detailed herein.

Finally, while the present invention in the preferred embodiment has been depicted as providing a trigger signal for use in conjunction with an ink-jet copier, the present invention may also be used to produce triggering signals synchronized with the angular displacement of any rotating object.

Thus while a preferred embodiment of the present invention has been shown and described, it will be apparent to those skilled in the art that many changes and modifications may be made without departing from the invention in its broader aspects. It is therefore intended that the appended claims cover all such changes and modifications as fall within the true spirit and scope of the present invention.

I claim:

1. An apparatus for generating a trigger signal synchronized with a selectable angular displacement of a rotating object comprising:

a position encoder to monitor the rotation of the rotating object and to produce an output signal proportional to object rotation through a fixed fraction of a revolution, a frequency multiplier coupled to generate an output signal having a frequency N times the frequency of the position encoder output signal, wherein N is an adjustable number, and a frequency divider coupled to generate the trigger signal of a frequency comprising a fixed fraction of the frequency of the frequency multiplier output signal, the angular displacement of the rotating object associated with each cycle of the trigger signal being selected by appropriate adjustment of N.

2. An apparatus as in claim 1 wherein the number of output cycles generated by the position encoder per revolution of the object is equal to the inverse of the fixed fraction associated with the fixed frequency divider such that the trigger signal contains N cycles per revolution of the object.

3. An apparatus as in claim 2 wherein N is an integer.

4. An apparatus as in claim 1 wherein the position encoder comprises:

a disk, attached for rotation with the object, having a plurality of detectable features evenly spaced about its circumference, and means mounted proximate the disk to generate an output signal each time a detectable feature rotates thereby.

5. An apparatus as in claim 1 wherein the value of N is adjusted according to a data signal applied to the frequency multiplier from external circuits.

6. An apparatus for generating a trigger signal having pulses synchronized with a selectable angular displacement of a rotating object comprising:

a position encoder to monitor the rotation of the rotating object and to produce an output signal pulse each time the object rotates through a fixed fraction of a revolution, an adjustable frequency divider for producing a pulsed output signal of frequency 1/Nth of the frequency of an input signal where N is an adjustable number, phase detecting means for producing a control voltage proportional to the phase difference between the output signals of the position encoder and the adjustable frequency divider, a voltage controlled oscillator for producing an output signal of frequency proportional to the magnitude of the control voltage, the output signal of the oscillator being applied as the input signal to the adjustable frequency divider such that the phase detecting means, the oscillator and the adjustable frequency divider form a phase locked loop, and a second frequency divider coupled to generate the pulsed trigger signal of frequency which is a fixed fraction of the frequency of the oscillator output signal, the angular displacement of the rotating object associated with each pulse of said trigger signal being selected by appropriate adjustment of N.

7. An apparatus as in claim 6 wherein the number of output pulses generated by the position encoder per revolution of the object is equal to the inverse of the fixed fraction associated with the fixed frequency divider such that the trigger signal contains N pulses per revolution of the object.

8. An apparatus as in claim 6 wherein N is an integer.

9. An apparatus as in claim 6 wherein the position encoder comprises:

a disk, attached for rotation with the object, having a plurality of detectable features evenly spaced about its circumference, and means mounted proximate to the disk to generate an output signal pulse each time a detectable feature passes thereby.

10. An apparatus as in claim 6 wherein the value of N is adjusted according to a data signal applied to the adjustable frequency divider from external circuits.

11. An apparatus for generating an ink-jet trigger signal for an ink-jet copy machine of the type wherein a copy is formed by an ink-jet spraying ink on paper comprising:

a rotating drum about which the paper is trained proximate the ink-jet, a position encoder to monitor the rotation of the drum and to produce an output signal pulse each time the drum rotates through a fixed fraction of a revolution, a frequency multiplier coupled to generate an output signal having a frequency N times the frequency of the position encoder output signal where N is an adjustable number, and a frequency divider coupled to generate the trigger signal of frequency which is a fraction of the frequency of the frequency multiplier output signal, the angular displacement of the drum associated with each cycle of the trigger signal being selected by appropriate adjustment of N.

12. An apparatus for generating ink-jet control for an ink-jet copy machine comprising:

a rotating drum about which paper is trained, an ink-jet directed at the paper for spraying ink on the paper as the drum rotates and a copy circuit for operating the ink-jet in accordance with a predetermined waveform, a position encoder to monitor the rotation of the drum and to produce an output signal each time the drum rotates through a fixed fraction of a revolution, a frequency multiplier coupled to generate an output signal having a frequency N times the frequency of the position encoder output signal where N is an adjustable number, a frequency divider coupled to generate a pulsed trigger signal of frequency a fixed fraction 1/M of the frequency of the frequency multiplier output signal, the angular displacement of the drum associated with each pulse of the trigger signal being selected by appropriate adjustment of N, and means applying output states of said frequency divider to construct an ink-jet excitation waveform for controlling said copy circuit.

13. An apparatus as in claim 12 wherein the number of output pulses generated by the position encoder per revolution of the object is equal to the inverse of the fixed fraction associated with the fixed frequency divider such that the trigger signal contains N pulses per revolution of the object divided into M parts.

14. An apparatus as in claim 13 wherein N is an integer.

15. An apparatus as in claim 12 wherein the position encoder comprises:

a disk, attached for rotation with the object, having a plurality of detectable features evenly spaced about its circumference, and means mounted proximate the disk to generate an output signal pulse each time a detectable feature rotates thereby.

16. An apparatus as in claim 12 wherein the value of N is adjusted according to a data signal applied to the frequency multiplier from external circuits.

* * * * *